United States Patent
Yoshii

(10) Patent No.: US 7,221,392 B2
(45) Date of Patent: May 22, 2007

(54) COLOR IMAGING APPARATUS AND METHOD FOR GENERATING DIGITAL COMPONENT SIGNAL

(75) Inventor: Toshio Yoshii, Kanagawa (JP)

(73) Assignee: Sony Corporation, Tokyo (JP)

( * ) Notice: Subject to any disclaimer, the term of this patent is extended or adjusted under 35 U.S.C. 154(b) by 752 days.

(21) Appl. No.: 10/608,623

(22) Filed: Jun. 27, 2003

(65) Prior Publication Data

US 2004/0090557 A1 May 13, 2004

Related U.S. Application Data

(63) Continuation of application No. 08/745,851, filed on Nov. 8, 1996, now abandoned.

(30) Foreign Application Priority Data

Nov. 11, 1995 (JP) .................................. 7-317378

(51) Int. Cl.
*H04N 5/235* (2006.01)
(52) U.S. Cl. .................. 348/222.1; 348/207.1
(58) Field of Classification Search ............ 348/231.9, 348/581, 396, 566, 458, 718, 231.99, 222.1, 348/207.1; 382/232
See application file for complete search history.

(56) References Cited

U.S. PATENT DOCUMENTS

| 4,989,091 A | 1/1991 | Lucas |
| 5,463,419 A | 10/1995 | Saito |

*Primary Examiner*—Tuan Ho
(74) *Attorney, Agent, or Firm*—Frommer Lawrence & Haug LLP; William S. Frommer; Thomas F. Presson

(57) ABSTRACT

In a color imaging apparatus, a problem of occupying a transmitting line can be avoided without changing color resolution and angle of view in the case of connecting to the external unit. The present invention provides converting means for converting a first digital component signal S1 which has the data rate of luminance data "Y" and first and second chroma data "U" and "V" being K×N:N:N into a second digital component signal S3 which has the same angle of view as said first digital component signal and has the data rate of the luminance data "Y" and the first and second chroma data "U" and "V" being K×N/M:N:N, thereby a second digital component signal S3 having a small amount of data can be generated without changing the angle of view and the color resolution as against the first digital component signal. Therefore, if such second digital component signal S3 is output to the external unit through the transmitting line, the problem of occupying the transmitting line can be avoided without changing the angle of view and the color resolution.

10 Claims, 7 Drawing Sheets

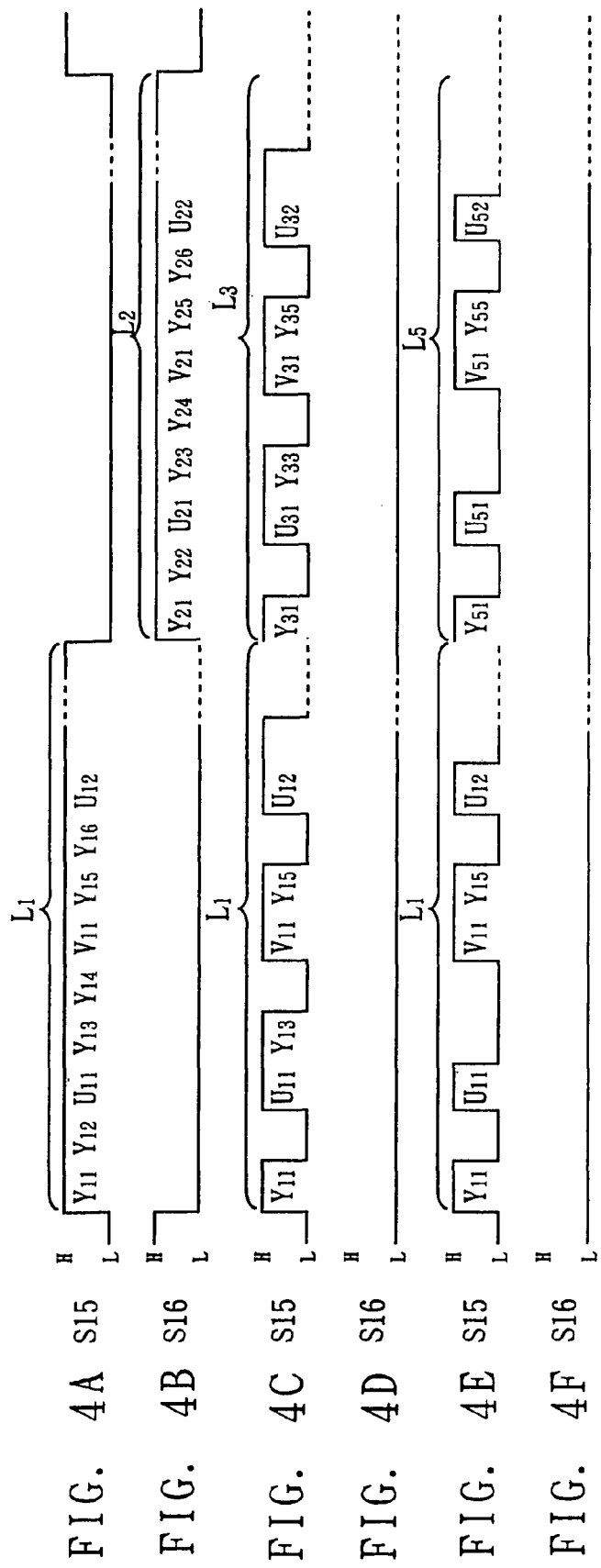

COLOR IMAGING APPARATUS AND METHOD FOR GENERATING DIGITAL COMPONENT SIGNAL

This is a Continuation of application Ser. No. 08/745,851 filed Nov. 8, 1996 now abandoned.

BACKGROUND OF THE INVENTION

1. Field of the Invention

This invention relates to a color imaging apparatus and a method for generating digital component signal, and more particularly, is applicable to a video camera used by connecting to a computer.

2. Description of the Related Art

Conventionally, computers perform various editing operations by taking in image data generated by video cameras. For example, an editing operation such that desired still picture is extracted from the taken image data to be reduced and pasted in a text made by a user is performed. Thereby, a document with a reference image can be created, and the document which a reader can easily understand can be easily created. In addition, an editing operation such that desired moving image is extracted from the taken image data to be reduced and pasted in other moving images, or to be combined with favorite music is performed. Thus desired moving image which suits user taste can be obtained.

In this way, in recent years, the computer takes in the image data created by the video cameras, and various kinds of editing operations are operated by using the image data.

In the above conventional editing operation, the computer takes in the image data created by the video camera through a predetermined transmitting line. However, in this time, since the image data created by the video camera is output to the computer as it is, the transmitting line is occupied for outputting the image data according to the amount of the image data. Therefore, there is inconvenience that other peripheral units which are connected to the transmitting line cannot access to the computer.

By the way, in the case where the computer performs the editing operation, editing operations mostly use reduced images, therefore, all taken image data are not used. Considering this point, if image data, corresponding to the reduced image which is used in the computer, having a small amount of data is output from the video camera, the above problem of occupying the transmitting line may be avoided. However, in this case, it is desired that the amount of data is reduced without changing the angle of view and the color resolution of the image data. Because the atmosphere and the color of the image may be different from the original image if the color resolution and the angle of view are changed.

SUMMARY OF THE INVENTION

In view of the foregoing, an object of this invention is to provide a color imaging apparatus and a method for generating digital component signal in which a problem of occupying a transmitting line can be avoided without changing color resolution and angle of view in the case of connecting to external unit.

The foregoing object and other objects of the invention have been achieved by the provision of a color imaging apparatus which comprises: digital component signal generating means for generating first digital component signal which indicates an image having predetermined angle of view and has the data rate of luminance data and first and second chroma data being K×N:N:N ("K" is an integral number more than two and "N" is a natural number); and converting means for converting first digital component signal into second digital component signal which indicates an image having the same angle of view as the first digital component signal and has the data rate of the luminance data and the first and second chroma data being K×N/M:N:N ("M" is a prime number of K×N).

In this way, the color imaging apparatus provides the converting means for converting the first digital component signal which has the data rate of the luminance data and the first and second data being K×N:N:N into the second digital component signal which has the same angle of view as the first digital component signal and has the data rate of the luminance data and the first and second chroma data being K×N/M:N:N, thereby the first digital component signal having a small amount of data can be generated without changing the angle of view and the color resolution as against the first digital component signal. Thus the problem of occupying the transmitting line can be avoided without changing the angle of view and the color resolution if such second digital component signal is output to external unit through the transmitting line.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 4A to 4F are timing charts showing timing of the read control signals S15 and S16;

DETAILED DESCRIPTION OF THE EMBODIMENT

Figure 1:
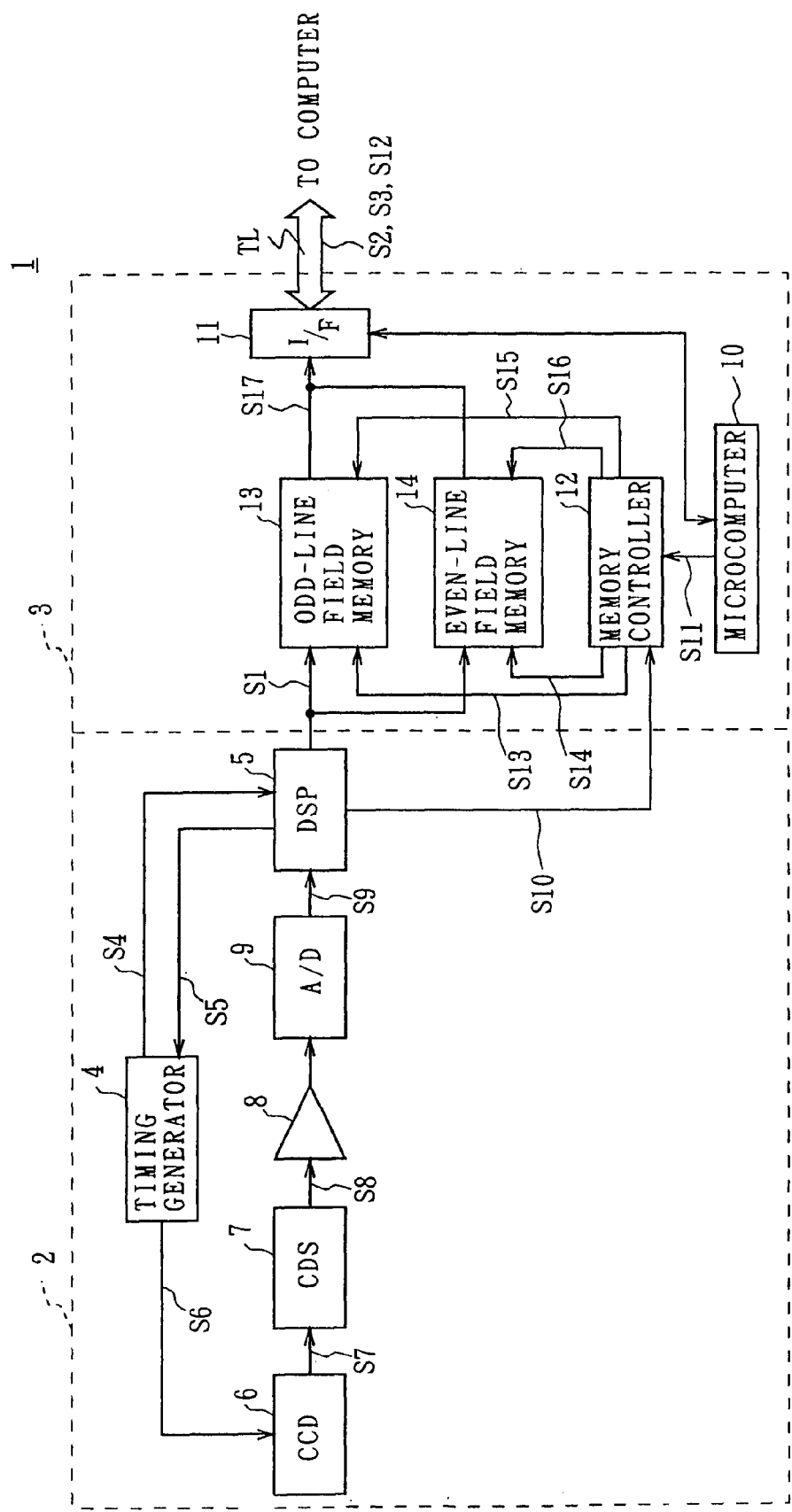
FIG. 1 is block diagram showing the construction of video camera according to an embodiment of the present invention.

Preferred embodiments of this invention will be described with reference to the accompanying drawings:

In FIG. 1, numeral 1 shows a video camera as a color imaging apparatus as a whole. An imaging section 2 generates a digital component signal S1 in which a data rate of luminance data "Y", color difference data (chroma data) "U" and "V" is 4:1:1 and which has video graphics array (VGA) format (the number of horizontal lines is 480 and the number of pixels is 640 per one horizontal line) which is a monitor display standard on computers, and supplies the digital component signal S1 to an image processing section 3.

The image processing section 3 changes an image size of the digital component signal S1 according to a control signal, S2 supplied from the external computer (not shown), and outputs a resultant digital component signal S3 to the computer through a predetermined transmitting line TL.

Therefore, the video camera 1 changes the image size of the digital component signal S1 according to demands of the computer in order to adjust the amount of data which is output to the transmitting line, thus a problem of occupying the transmitting line which has been a conventional problem can be avoided.

Here, the construction of each section will be concretely described below. First, the imaging section 2 provides a timing generator 4 for generating a clock signal for controlling various kinds of timing. A standard clock signal S4 generated at the timing generator 4 is supplied to a digital signal processor (DSP) 5. The digital signal processor 5 generates a timing control signal S5 consisting of signals such as a horizontal synchronizing signal HD, a vertical synchronizing signal VD, a blanking signal BLK, and a field discriminating signal FLD, on the basis of the standard clock signal S4, and then sends back the timing control signal S5 to the timing generator 4. The timing generator 4 generates a clock signal S6 in which the number of clock pulses is 908 per one horizontal cycle on the basis of the timing control signal S5, and supplies the clock signal S6 to an area CCD (Charge Coupled Device) 6.

The area CCD 6 is used as an analog imaging signal generating means for generating an analog imaging signal by imaging an object, and is composed of an area CCD having non-interlace system (that is, a system for reading all pixels) or an area CCD having interlace system. In this connection, in the case of this embodiment, a phase alternation line (PAL) area CCD having the interlace system is used as the area CCD 6.

The area CCD 6 is operated based on the clock signal S6 and outputs an analog color imaging signal S7 generated by imaging the object to a correlated double sampling circuit (CDS) 7 at a timing of the clock signal S6. In this connection, in the case of this embodiment, by using the PAL area CCD and by using the clock signal S6 in which the number of the clock pulses is 908 per one horizontal cycle, the area CCD 6 outputs an interlace scanned color imaging signal S7 having the number of the horizontal lines of 625 and the number of the clocks of 908 per one horizontal line.

The correlated double sampling circuit 7 eliminates reset noise from the color imaging signal S7, and then the resultant color imaging signal S8 is amplified through an amplifier 8 to be output to an analog-to-digital converting circuit (A/D) 9. The analog-to-digital converting circuit 9 converts the color imaging signal S8 into a digital signal by using predetermined sampling clock to output the resultant digital color imaging signal S9 to the digital signal processor 5.

The digital signal processor 5 generates, based on the supplied color imaging signal S9, a digital component signal S1 in which the number of horizontal lines is 480, the number of pixels is 640 per one horizontal line, and the data rate of the luminance data "Y", the color difference data "U" and "V" is 4:1:1. Then the digital component signal S1 is output to the image processing section 3 with a timing control signal S10.

In this connection, the timing control signal S10 is basically the same as the timing control signal S4, and consists of signals such as the horizontal synchronizing signal HD, the vertical synchronizing signal VD, the blanking signal BLK, and the field discrimination signal FLD (however, the phase of each signal is a little different as compared with the timing control signal S5).

The image processing section 3 provides a microcomputer 10. the microcomputer 10 controls all operations of the image processing section 3. The microcomputer 10 receives the control signal S2 from the external computer through an interface circuit (I/F) 11 used as input and output means, and then examines the image size which is demanded from the computer by checking the contents of the control signal S2. In this case, the control signal which is output from computer includes a video mode bit consisting of 32 bits, and the image size which is demanded from the computer can be recognized by checking the video mode bit.

For example, if a third bit in the video mode bit is "1", a digital component signal of which the image size is the full size is demanded. Further, if a second bit in the video mode bit is "1", a digital component signal of which the image size is the half size is demanded. Furthermore, if a first bit in the video mode bit is "1", a digital component signal of which the image size is quarter size is demanded.

In this connection, the full size is a standard size on the VGA format, and is the image size in which the number of the horizontal lines is 480 and the number of pixels is 640 per one horizontal line. Further, the half size means ½ of the full size vertically and horizontally, and is the image size in which the number of the horizontal lines is 240 and the number of pixels is 320 per one horizontal line. In similarity, the quarter size means ¼ of the full size vertically and horizontally, and is the image size in which the number of the horizontal lines is 120 and the number of the pixels is 160. Note that, as can been seen from this explanation, the half size and the quarter size are equality reduced vertically and horizontally, and of which angle of view are the same as that of the full size.

The microcomputer 10 checks the video mode bit to detect the image size which the control signal S2 demands, then outputs a data rate control signal S11 indicating the detected image size to a memory controller 12. Thereby, in the image processing section 3, the memory controller 12 controls operations of two field memories 13 and 14 to change the number of the lines of the digital component signal S1 and to change the data rate of the luminance data "Y" and the color difference data "U" and "V", and then a digital component signal S3 having a demanded image size is generated. Also, the microcomputer 10 generates a data rate signal S12 which indicates the data rate of the luminance data "Y" and the color difference data "U" and "V" of the digital component signal S3 to be output, and outputs the data rate signal S12 to the computer through the interface circuit 11. Therefore, the computer can confirm the data rate of the digital component signal S3 which is output from the video camera 1.

Here, the change of the image size which is performed by the memory controller 12 will hereinafter be described.

First, the memory controller 12 divides the digital component signal S1, sequentially writes it in the field memories 13 and 14, and sequentially read the written digital component signal S1. In this time, the image size is changed by adjusting the amount of the data which is read in accordance with the data rate control signal S11.

Figure 2:
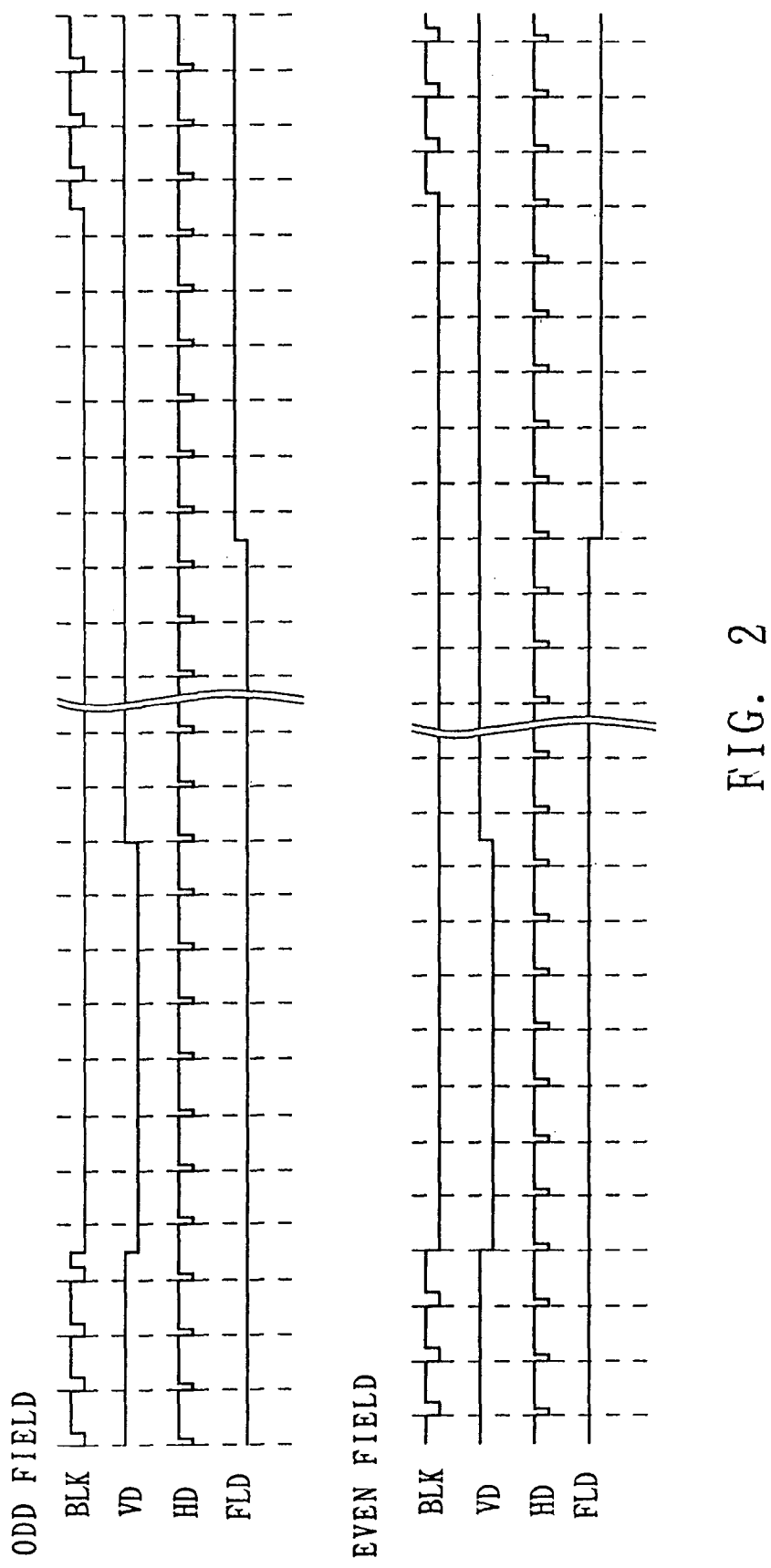
FIG. 2 is a timing chart showing timing of the timing controlling signal S10.

In the case of the writing operation, the memory controller 12 discriminates a logical level of the timing control signal S10 shown in FIG. 2, thereby odd and even fields of the digital component signal S1 are detected and starting timing of the odd and even fields are detected. Specifically, timing in which the vertical synchronizing signal VD and the horizontal synchronizing signal HD are simultaneously falls to logical level "L" is detected as the starting timing of the even field, and timing in which the field discrimination signal FLD rises to logical level "H" is detected as the starting timing of the odd field.

As a result, if the odd field is detected, the memory controller 12 controls the field memory 13 to be in the state of write-enable by outputting the write control signal S13 having the logical level "H" to the field memory 13, then the luminance data "Y" and color difference data "U" and "V" of the odd lines in the digital component signal S1 are sequentially written in the field memory 13. On the other hand, if the even field is detected, the memory controller 12 controls the field memory 14 to be in the state of write-enable by outputting the write control signal S14 having the logical level "H" to the field memory 14, then the luminance data "Y" and color difference data "U" and "V" of the even lines in the digital component signal S1 are sequentially written in the field memory 14.

Figure 3A:
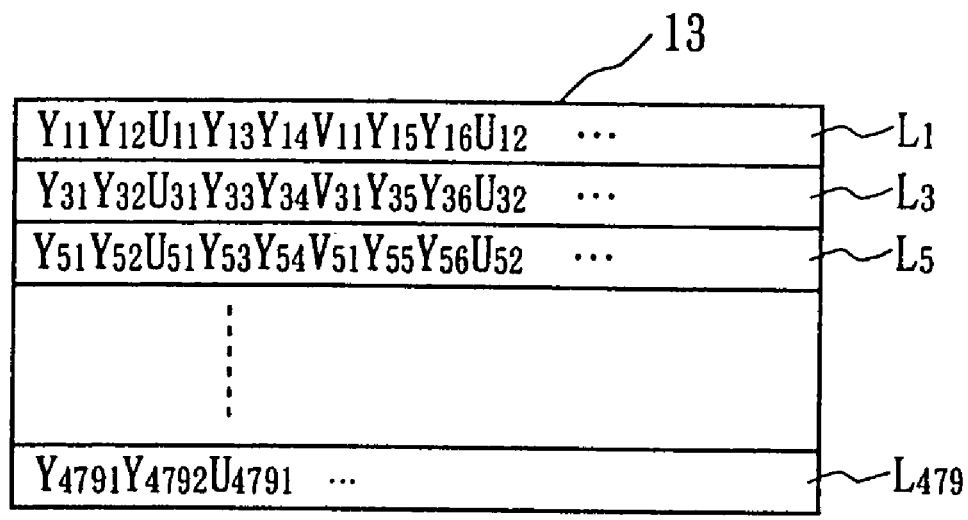
FIGS. 3A and 3B are schematic diagrams explaining data to be written in each memory.
Figure 3B:
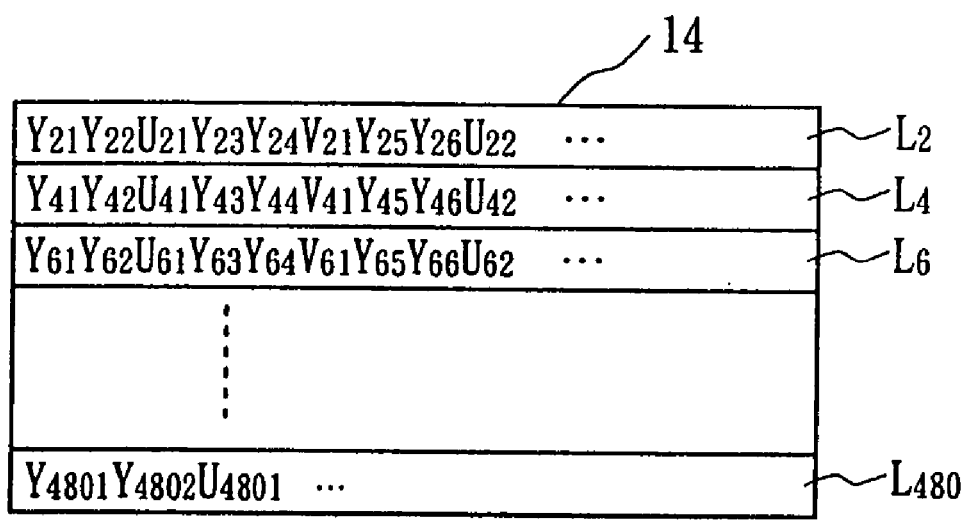

Thus the luminance data "Y" and color difference data "U" and "V" of the odd lines $L_1, L_3, \ldots, L_{479}$ in the digital component signal S1 are written in the field memory 13 as shown in FIG. 3A, and the luminance data "Y" and color difference data "U" and "V" of the even lines $L_2, L_4, \ldots, L_{480}$ in the digital component signal S1 are written in the field memory 14 as shown in FIG. 3B.

Also, the memory controller 12 generates the digital component signal S3 by reading the luminance data "Y" and the color difference data "U" and "V" written in the field memories 13 and 14 at the same time of the writing operations. At this time, the memory controller 12 changes the image size of the digital component signal S3 by adjusting the amount of the data which is read in accordance with the data rate control signal S11.

For example, in the case where the data rate control signal S11 designates the full size, write control signals S15 and S16 shown in FIGS. 4A and 4B are output to read all data written in the field memories 13 and 14. That is, in this case, at first the write control signal S15 having the logical level "H" is output to read the luminance data and color difference data ($Y_{11}, Y_{12}, U_{11}, Y_{13}, V_{11}, Y_{15}, \ldots$) of the line $L_1$ from the field memory 13, after that, the read control signal S16 having the logical level "H" is output to read the luminance data and color difference data ($Y_{21}, Y_{22}, U_{21}, Y_{23}, Y_{24}, V_{21}, Y_{25}, \ldots$) of the line $L_2$ from the field memory 14. After that, the read control signal—S15 having the logical level "H" is output again to read the luminance data and color difference data ($Y_{31}, Y_{32}, U_{31}, Y_{33}, Y_{34}, V_{31}, Y_{35}, \ldots$) of the line $L_3$ from the field memory 13.

Figure 5:
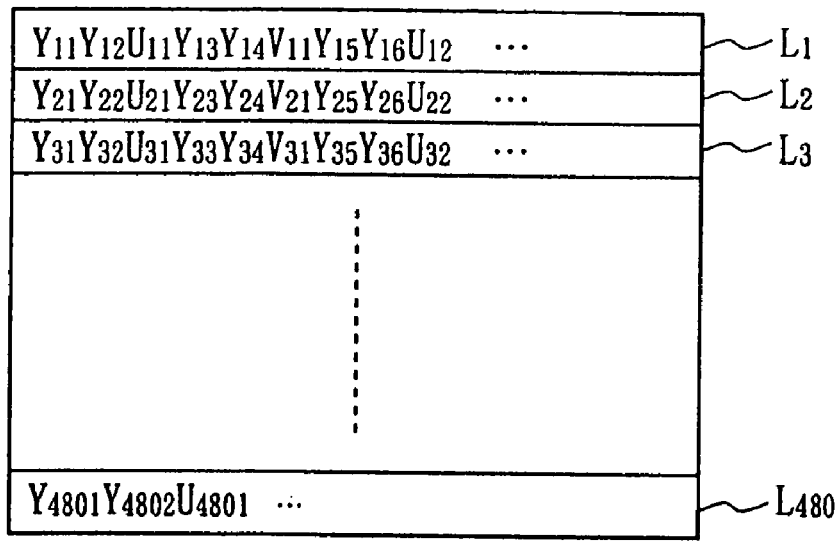
FIG. 5 is a schematic diagram explaining data construction when full size.

After that, the odd line and the even line are alternatively read from the field memories 13 and 14 by repeating the above process in order to generate a digital component signal S17. In this case, since the odd line and the even line are alternatively read, the digital component signal S17 is a signal having non interlace scanning system as shown in FIG. 5. In addition, since all data written in the field memories 13 and 14 are read, the image size is the full size in which the number of the horizontal lines is 480, the number of the pixels is 640 per one horizontal line, and the data rate of the luminance data "Y" and the color difference data "U" and "V" is 4:1:1.

Thus, the digital component signal S17 is output to the computer through the interface circuit 11 as a digital component signal S3.

Further, in the case where the data rate control signal S11 designates the half size, the luminance data "Y" and the color difference data "U" and "V" are read from one memory out of the field memories 13 and 14 to reduce the number of the lines in half, in addition, the data rate of the luminance data "Y" and the color difference data "U" and "V" is changed to 4:2:2 by thinning out the luminance data of each line with predetermined interval in order to reduce the number of the pixels in half, thereby the half size of the digital component signal S3 is generated. In this connection, in this embodiment, as shown in FIG. 4D, the logical level of the read control signal S16 is always set to level "L", and only data of the odd line is read only from the field memory 13.

Figure 6:
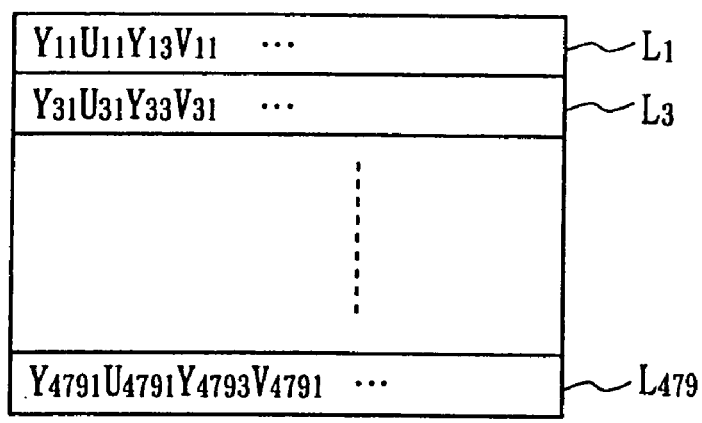
FIG. 6 is a schematic diagram explaining data construction when half size.

First, the memory controller 12 outputs a read control signal S15 and reads the luminance data "Y" and color difference data "U" and "V" of the line $L_1$ from the field memory 13. In this time, as shown in FIG. 4C, the logical level of the luminance data "Y" in the read control signal S15 are set to level "L" every other data, thereby the luminance data "Y" are read on every other data. Next, the memory controller 12 reads the luminance data "Y" and the color difference data "U" and "V" of the line $L_3$ from the field memory 13. In this case also, the logical level of the luminance data "Y" in the read control signal S15 are set to level "L" on every other data, thereby the luminance data "Y" is read on every other data. In the same way, the luminance data "Y" and the color difference data "U" and "Y" of respective lines are sequentially read from the field memory 13, and the luminance data "Y" are thinned and read every other data with respect to respective lines. Therefore, the data construction of the digital component signal S17 is shown in FIG. 6. The number of the lines is reduced in half in the vertical direction, and the data rate of the luminance data "Y" and the color difference data "U" and "V" is changed to 4:2:2 and the number of the pixels is reduced in half in the horizontal direction (the number of the pixels is reduced in half by reducing the luminance data "Y" in half), thus the image size is changed to the half size.

Thus the digital component signal S17 is output to the computer through the interface circuit 11 as the digital component signal S3. In this time, in the interface circuit 11, after blank areas, generated by thinning the luminance data "Y", in the digital component signal S17 are closed up, the signal S17 is output as the digital component signal S3.

Further, in the case where the data rate control signal S11 designates the quarter size, the luminance data "Y" and the color difference data "U" and "V" are read on every other line from one memory out of the field memories 13 and 14 to reduce the number of the lines in quarter, and the data rate of the luminance data "Y" and color difference data "U" and "V" is changed to 4:4:4 by thinning the luminance data with predetermined interval on respective lines in order to reduce the number of the pixels in quarter, thereby quarter size of the digital component signal S3 is generated. In this connection, in this embodiment, as shown in FIG. 4F, the logical level of the read control signal S16 is always set to the level "L", and data are read only from the field memory 13.

Figure 7:
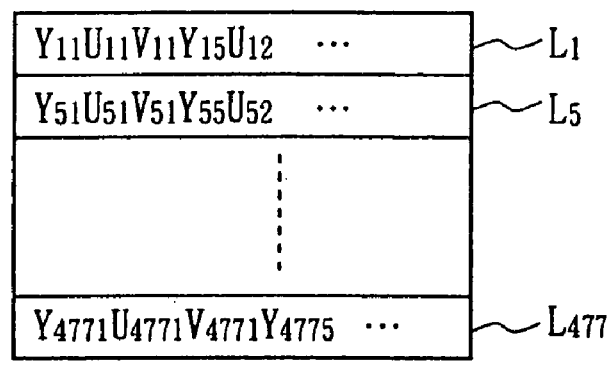
FIG. 7 is a schematic diagram explaining data construction when quarter size.

First, the memory controller 12 outputs the read control signal S15 to read the luminance data "Y" and the color difference data "U" and "V" from the field memory 13. In this case, as shown in FIG. 4E, the logical level of the luminance data "Y" in the read control signal S15 is set to the level "H" only once four times, thereby the luminance data "Y" is read only once four times (that is, the luminance data "Y" is thinned three every four and is read). Next, the memory controller 12 reads the luminance data "Y" and the color difference data "U" and "V" of the line $L_5$ which is a line after next line from the field memory 13. In this case, in a similar way, the logical level of the luminance data "Y" in the read control signal S15 is set to the level "H" once four times, thereby the luminance data "Y" is read only once four times. After that, similarly, the luminance data "Y" and color difference data "U" and "V" are read on every other line from the field memory 13, and the luminance data "Y" are read once four times on each line. Therefore, the data construction of the digital component signal S17 is shown in FIG. 7. The number of the lines is reduced in quarter in the vertical direction, and the data rate of the luminance data "Y" and the color difference data "U" and "V" is changed to 4:4:4 and the number of the pixels is reduced in quarter (the number of the pixels is reduced in quarter by reducing the luminance data "Y" in quarter) in horizontal direction, thus the image size is changed to the quarter size.

Thus, the digital component signal S17 is output to the computer through the interface circuit 11 as the digital component signal S3. In this case also, in the interface circuit 11, after blank areas, generated by thinning the luminance data "Y", in the digital component signal S17 are closed up, the signal S17 is output as the digital component signal S3.

In the aforesaid configuration, in the case where the video camera 1, the image size which the computer demands is detected by checking the contents of the control signal S2 which is output from the computer.

In this case, in the video camera 1, at first the odd lines $L_1$, $L_3$, . . . in the digital component signal S1 are written in the field memory 13 and the even lines $L_2$, $L_4$, . . . in the digital component signal S1 are written in the field memory 14. Then the method of reading data written in the field memories 13 and 14 is changed according to the data rate control signal S11, thereby the digital component signal S3 having the desired image size is generated.

For example, in the case of the full size, the luminance data "Y" and the color difference data "U" and "V" on the odd lines and the even lines written in the field memories 13 and 14 are alternatively read, and all data written in the field memories 13 and 14 are read. Therefore, the full size digital component signal S3, in which the number of the horizontal line is 480 and the number of the pixels is 640 per one horizontal line, having VGA format is generated.

Further, in the case of the half size, the luminance data "Y" and the color difference data "U" and "V" are read only from the field memory 13 to reduce the number of the lines in half, and the data rate of the luminance data "Y" and the color difference data "U" and "V" is changed to 4:2:2 by reading the luminance data "Y" on every other data in order to reduce the number of the pixels in half on each line. Thereby the half size digital component signal S3 in which the number of the horizontal lines is 240 and the number of the pixels is 320 per one horizontal line.

Furthermore, in the case of the quarter size, the luminance data "Y" and the color difference data "U" and "V" are read from the field memory 13 on every other line to reduce the number of the lines in quarter, and the data rate of the luminance data "Y" and the color difference data "U" and "V" is changed to 4:4:4 by reading the luminance data "Y" once four times on each line in order to reduce the number of the pixels in quarter. Thereby the quarter size digital component signal S3 in which the number of the horizontal lines is 120 and the number of the pixels is 160 per one horizontal lines is generated.

Figure 8:
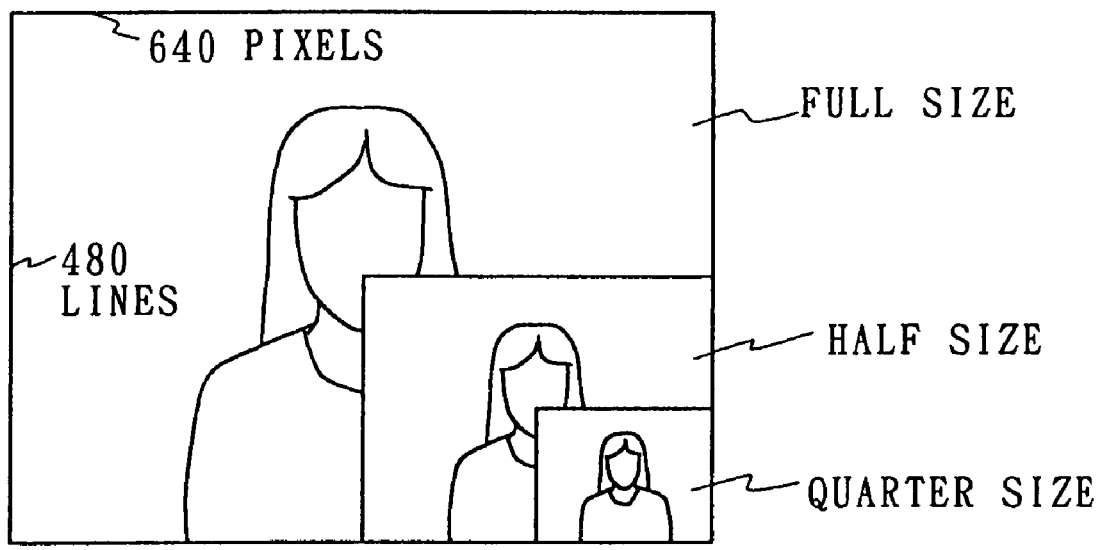
FIG. 8 is a schematic diagram explaining the size of image of digital component signal.

In this way, in the video camera 1, the luminance data ayes and the color difference data "U" and "V" written in the field memories 13 and 14 are thinned and read with predetermined interval on the basis of the data rate control signal S11, thereby the image size of the digital component signal S3 which is output to the computer is changed. Thus, as shown in FIG. 8, the digital component signal S3 having such image size as the half size or the quarter size can be output according to the demands of the computer. In this connection, when the image size of the digital component signal S3 is changed, the thinning rate of lines in the vertical direction is equal to the thinning rate of the luminance data "Y" in the horizontal direction, thereby the angle of the picture the same as that of the digital component signal S1 can be maintained.

In this way, in the video camera 1, the digital component signal S1 is converted to the digital component signal S3 in which the angle of view is the same as that of the digital component signal S1 and the data rate of the luminance data "Y" and the color difference data "U" and "V" is 4:2:2 or 4:4:4, further the converted digital component signal S3 is output to the computer. Thereby the amount of the data which is output to the transmitting line can be reduced with maintaining the angle of view the same as that of the original picture. Thus in the case of the video camera 1, the problem of occupying the transmitting line can be avoided.

In addition, in the video camera 1, since the data rate is changed by thinning only the luminance data "Y" without thinning the color difference data "U" and "V", the same color resolution as the original picture is maintained without deterioration.

Further, in the case of the video camera 1, the digital component signal S1 is divided into the odd line and the even line to be written in the field memories 13 and 14 respectively. Therefore, in the case where the half size of digital component signal S3 is generated by reducing the number of the lines in half, since data may be read only from one memory out of the memories, the read control of memory can be simplified.

According to aforesaid configuration, the reading operation of the field memories 13 and 14 is controlled on the basis of the data rate control signal S11 to generate the digital component signal S3 of which the angle of view is the same as that of the digital component signal S1 and in which the data rate of the luminance data "Y" and the color difference data "U" and "V" is 4:2:2 or 4:4:4, and then the digital component signal S3 is output to the computer. Thus the problem of occupying the transmitting line can be avoided without changing the angle of view and the color resolution.

According to the aforesaid embodiment, the full size of digital component signal S1, in which the number of the horizontal lines is 480 and the number of the pixels is 640 per one horizontal line, having VGA format is generated by the digital signal processor 5. However, in the second embodiment, a digital component signal having VGA format is generated when data is read from the field memories 13 and 14.

First, in the case of this embodiment, the digital signal processor 5 generates a digital component signal S1, in which the number of the horizontal lines is 582 (consisting of 575 lines in the image area and 7 lines in the vertical blanking cycle) and the number of the pixels is 756 per one horizontal line (consisting of 683 pixels in the image area and 73 pixels in the vertical blanking cycle) and the data rate of the luminance data "Y" and the color difference data "U" and "V" is 4:1:1, on the basis of a color imaging signal S9 to be input, and then the digital component signal S1 is output to the image processing section 3 with a timing control signal S10.

In the image processing section 3, the memory controller 12 controls the field memories 13 and 14 to sequentially write the digital component signal S1 similarly to the first embodiment. That is, the odd field and the even field in the digital component signal S1 are detected based on the timing control signal S10. If the odd field is detected, the luminance data "Y" and the color difference data "U" and "V" in the odd lines are sequentially written in the field memory 13, on the other hand, if the even field is detected, the luminance data "Y" and the color difference data "U" and "V" in the even lines are sequentially written in the field memory 14.

Also, at the same time of the writing operation, the memory controller 12 reads the luminance data "Y" and the color difference data "U" and "V" in order from the field memories 13 and 14 on the basis of the data rate control signal S11 in order to generate the digital component signal S3. For example, in the case where the data rate control signal S11 designates the full size, the luminance data "Y" and the color difference data "U" and "V" are read for each line from both the field memories 13 and 14 alternatively. In this time, the 51st line to 530th line, that is, the lines $L_{51}$ to $L_{530}$ are read, and the luminance data "Y" and the color difference data "U" and "V" from 59th pixel to 698th pixel are read in respective lines $L_{51}$ to $L_{530}$. Thereby the full size of digital component signal S3 in which the number of the horizontal lines is 480 and the number of the pixels is 640 per one horizontal line is generated.

Further, the data rate control signal S11 designates the half size, the luminance data "Y" and the color difference data "U" and "V" are read only from the field memory 13. In this time, the odd lines 51st to 530th, that is, the odd lines $L_{51}$, to $L_{529}$ are read, and the luminance data "Y" and the color difference data "U" and "V" from 59th pixel to 698th pixel are read with thinning the luminance data "Y" on every other data on respective lines. Thereby the half size of digital component signal S3 in which the number of the horizontal lines is 240 and the number of the pixels is 320 per one horizontal line and the data rate of the luminance data "Y" and the color difference data "U" and "V" is 4:2:2 is generated.

Furthermore, in the case where the data rate control signal S11 designates the quarter size, the luminance data "Y" and the color difference data "U" and "V" are read from the field memory 13 on every other line. At this time, the odd lines $L_{51}$ to $L_{529}$ are read on every other line, and the luminance data "Y" and the color difference data "U" and "V" from 59th pixel to 698th pixel are read with thinning the luminance data "Y" three for each four data. Thereby the digital component signal S3 in which the number of the horizontal lines is 120 and the number of the pixels is 160 per one horizontal line and the data rate of the luminance data "Y" and the color difference data "U" and "V" is 4:4:4 is generated.

Figure 9:
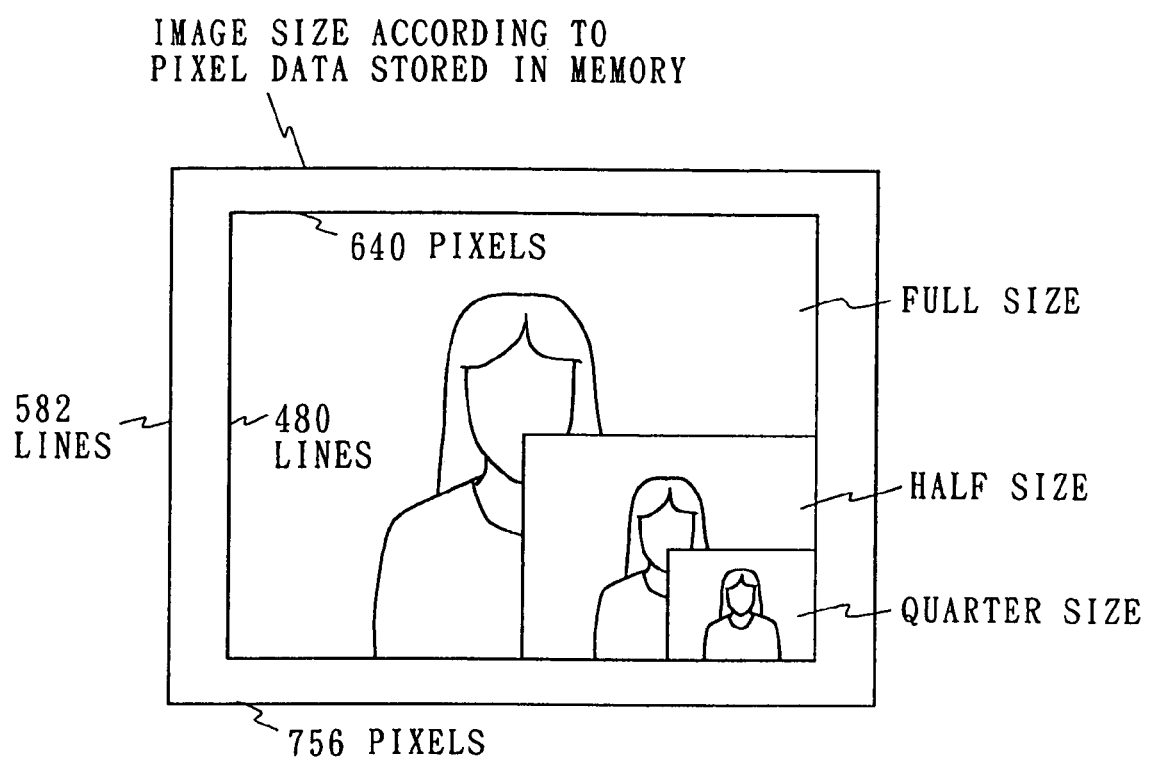
FIG. 9 is a schematic diagram explaining VGA conversion by cutting from memory.

In this embodiment, only data portion in a predetermined area out of the luminance data "Y" and the color difference data "U" and "V" which have been written in the field memories 13 and 14 is cut out and read, thereby the digital component signal S3, having the image size determined by the VGA format shown in FIG. 9, is generated. Therefore, in the case of this embodiment, without converting a signal into a signal having VGA format by the digital signal processor 5, only the area of reading the field memories 13 and 14 is controlled, and the signal can be easily converted into the signal having VGA format.

According to the aforesaid embodiment, the digital component signal S3 having VGA format is generated by controlling the reading area of the field memories 13 and 14, thereby the operation of the digital signal processor 5 can be simplified.

Note that, according to the aforesaid embodiment, the image size of the digital component signal S1 is changed by using two field memories 13 and 14, however, the present invention is not limited thereto and the image size of the digital component signal S1 can be changed by using the one frame memory. So long as the luminance data "Y" and the color difference data "U" and "V" written in the memory are read with the above described rule, the same effect as the above described can be obtained.

Further, according to the aforesaid embodiment, the control signal S2 including video mode bit which designates the image size is output from the computer, and the microcomputer 10 examines the control signal S2 to generate the data rate control signal S11 corresponding to the designated image size, however, the present invention is not limited thereto and a data rate control signal is directly output from the computer and then the microcomputer 10 can merely output the data rate control signal to the memory controller 12. In addition, operation input means is provided, and when a user inputs a command which designates the image size from the operation input means, the microcomputer 10 can generate the data rate control signal corresponding to the designated image size.

Further, according to the aforesaid embodiment, a digital component signal S1 in which the data rate of the luminance data "Y" and the color difference data "U" and "V" is 4:1:1 is generated, and the data rate of the digital component signal S1 is converted to 4:2:2 or 4:4:4 in accordance with the image size which is designated by the data rate control signal S1, however, the present invention is not limited thereto and a digital component signal in which the luminance data "Y" and the color difference data "U" and "V" is K×N:N:N ("K" is an integral number more than two and "N" is a natural number) is generated, and the data rate of the digital component signal can be converted to K×N/M:N:N any is a prime number of K×N) in accordance with the image size which is designated by the data rate control signal. In short, the data rate of the digital component signal can be changed in accordance with the image size which is designated by the data rate control signal.

Further, in the aforesaid embodiment, the digital component signal S1 in which the aspect ratio of the image is 4:3 is generated suiting the monitor standard of the computer, however, the present invention is not limited thereto and the aspect ratio of the image can be other ratio such as 16:9.

Furthermore, in the aforesaid embodiment, the present invention is applied to the video camera 1, however, the present invention is not limited thereto and the present invention can be applied to other color imaging apparatus as long as a digital component signal is generated.

As described above, the present invention provides converting means for converting the first digital component signal in which the data rate of the luminance data and the first and second chroma data is K×N:N:N into the second digital component signal in which the angle of view is the same as that of the first digital component signal and the luminance data and the first and second chroma data is K×N/M:N:N, thereby the second digital component signal having a small amount of data can be obtained without changing the angle of view and the color resolution as against the first digital component signal. Therefore, if such second digital component signal is output to the external unit through a transmitting line, the problem of occupying the transmitting line can be avoided without changing the angle of view and the color resolution.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A color imaging apparatus, comprising:

analog color imaging signal generating means for generating an analog color imaging signal;

digital component signal generating means for generating a first digital component signal which indicates an image having predetermined angle of view and which has the data rate of luminance data and first and second chroma data being K×N:N:N ("K" is an integral number more than two and "N" is a natural number) from said analog color imaging signal; and converting means for converting said first digital component signal into a second digital component signal which indicates an image having the same angle of view as said first digital component signal and which has the data rate of the luminance data and the first and second chroma data being K×N/M:N:N, wherein M is a variable number dependent on the data rate control signal, and wherein the data rate control signal is changed by thinning luminance data without thinning color difference data.

2. The color imaging apparatus according to claim 1, wherein:

said converting means generates said second digital component signal by thinning all the luminance data and the first and second chroma data in lines decided based on said data rate control signal, and thinning only luminance data in said first digital component signal with an interval decided based on said data rate control signal in each line which is not thinned.

3. The cooler imaging apparatus according to claim 1, wherein:

said converting means comprises storing means for temporarily storing said first digital component signal generated by said digital component signal generating means; and generates said second digital component signal by reading the luminance data and the first and second chroma data from said storing means on the basis of said data rate control signal.

4. The color imaging apparatus according to claim 3, wherein said storing means, comprises first memory for storing data of odd lines of said first digital component signal; and second memory for storing data of even lines of said first digital component signal.

5. The color imaging apparatus according to claim 1, wherein said "K" is "4" and said "N" is "1".

6. The color imaging apparatus according to claim 1, further comprising input means for inputting said data rate control signal from an external unit.

7. The color imagining apparatus according to claim 1, further comprising data rate signal generating means for generating a data rate signal indicating the data rate of the luminance data and the first and second chroma data which constitutes said second digital component signal.

8. The color imaging apparatus according to claim 7, further comprising, outputting means for outputting said data rate signal and said second digital component signal to an external unit.

9. A method for generating digital component signal, comprising the steps of:

generating an analog color imaging signal;

generating a first digital component signal which indicates an image having predetermined angle of view and which has the data rate of luminance data and first and second chroma data being K×N:N:N ("K" is an integral number more than two and "N" is a natural number) from said analog color imagining signal; and converting said first digital component signal into second digital component signal which indicates an image having the same angle of view as said first digital component signal and which has the data rate of the luminance data and the first and second chroma data being K×N/M:N:N, wherein M is a variable number dependent on the data rate control signal, and wherein the data rate control signal is changed by thinning luminance data without thinning color difference data.

10. The method for generating digital component signal according to claim 9, wherein in said converting step, all luminance data and first and second chroma data in lines decided based on said data rate control signal are thinned, and only said luminance data of said first digital component signal are thinned with an interval decided based on said data rate control signal in each line, thereby said second digital component signal is generated.

* * * * *